US007391021B2

(12) United States Patent
Stoermer et al.

(10) Patent No.: US 7,391,021 B2

(45) Date of Patent: Jun. 24, 2008

(54) ION GUIDES WITH RF DIAPHRAGM STACKS

(75) Inventors: Carsten Stoermer, Breman (DE); Andreas Brekenfeld, Bremen (DE); Thomas Wehkamp, Bremen (DE); Jochen Franzen, Bremen (DE)

(73) Assignee: Bruker Dalton K GmbH, Bremen (DE)

(*) Notice: Subject to any disclaimer, the term of this patent is extended or adjusted under 35 U.S.C. 154(b) by 270 days.

(21) Appl. No.: 11/243,440

(22) Filed: Oct. 4, 2005

(65) Prior Publication Data

US 2006/0076485 A1 Apr. 13, 2006

(30) Foreign Application Priority Data

Oct. 5, 2004 (DE) ...................... 10 2004 048 496

(51) Int. Cl.
*B01D 59/44* (2006.01)
*H01J 49/00* (2006.01)

(52) U.S. Cl. ........................ 250/292; 250/396; 250/291; 250/290; 250/281; 250/282; 250/288

(58) Field of Classification Search ................. 250/292, 250/291, 281, 282, 288, 290, 396 R
See application file for complete search history.

(56) References Cited

U.S. PATENT DOCUMENTS

| | | | | |
|---|---|---|---|---|
| 4,213,557 | A | 7/1980 | Franzen et al. | |
| 5,572,035 | A | 11/1996 | Franzen | |
| 6,107,628 | A * | 8/2000 | Smith et al. | 250/292 |
| 7,164,125 | B2 * | 1/2007 | Weiss et al. | 250/292 |
| 2002/0063210 | A1 | 5/2002 | Bateman et al. | |
| 2002/0148959 | A1 | 10/2002 | Weiss et al. | |
| 2003/0136905 | A1 * | 7/2003 | Franzen et al. | 250/292 |

FOREIGN PATENT DOCUMENTS

| | | | |
|---|---|---|---|
| DE | 2 737 903 | B1 | 8/1977 |
| DE | 10 2004 037 511.9 | A1 | 8/2004 |
| EP | 1 220 291 | A2 | 7/2002 |
| EP | 1220292 | A2 | 7/2002 |
| EP | 1465234 | A2 | 10/2004 |
| GB | 2392005 | A | 6/2003 |
| WO | WO 01/64320 | A1 | 9/2001 |

* cited by examiner

*Primary Examiner*—Jack I. Berman
*Assistant Examiner*—Meenakshi S Sahu
(74) *Attorney, Agent, or Firm*—The Law Offices of Paul E. Kudirka

(57) ABSTRACT

The invention relates to RF voltage-operated ion guides based on stacked apertured diaphragms. The invention provides ion guides consisting of diaphragm stacks that permit the ion beam to be shaped in cross-section so that it corresponds to the acceptance profile of the subsequent section of the device, therefore yielding optimal ion transmission. For this purpose, at least some of the diaphragms in the diaphragm stacks do not have circular openings, but instead have openings which shape the cross section of the emerging ion beam in the desired manner. It is possible, for instance, to obtain elliptical beam cross sections, divided beams or beams focused to the shape of a fine thread at the output of the diaphragm stacks.

14 Claims, 4 Drawing Sheets

ION GUIDES WITH RF DIAPHRAGM STACKS

FIELD OF THE INVENTION

The invention relates to RF voltage-operated ion guides based on stacked apertured diaphragms.

BACKGROUND OF THE INVENTION

Most ion guides consist of multipole structures, extending longitudinally, having rod-shaped pole pieces. Their disadvantage is that they do not actively drive the ions forward without complicated additional measures. For this reason, ion guides consisting of stacked diaphragms with circular apertures (known as "stacked rings") are sometimes used for special purposes; an axial DC or modulated potential gradient permits the ions to be driven forward actively. Examples of this include ion funnels used to capture the ions from a gas flowing into the vacuum, collision cells with diaphragms of constant internal diameter and with active forward drive ("ion tunnels"), and ion packeting equipment using a traveling wave field to provide a forward drive of an ion beam with a desired time profile of ion density.

For example, U.S. Pat. No. 6,107,628 (R. D. Smith and S. A. Shaffer) elucidates an arrangement of an ion funnel in which ions are extracted from a stream of gas and are directed to the output opening that leads to the next differential pump stage. The ion yield is significantly greater than when simple skimmer diaphragms are used. This ion funnel represents a special case of the general description of ion guides in U.S. Pat. No. 5,572,035 (J. Franzen), in which, among other embodiments, arrangements of stacked rings have already been described, operated at radio frequency voltages (RF) with an axial direct current (DC) potential gradient and with both cylindrical or conical internal open space.

Diaphragm stacks in the form of ion funnels are being used more and more frequently instead of the gas skimmers usually applied. The ion funnel consists of a package of coaxially arranged diaphragms having circular apertures, in which the diameters of the circular holes diminishes increasingly toward the central exit hole that leads into the next chamber. The diaphragms are stacked with relatively small spaces between the apertured diaphragms. This creates the shape of a funnel inside the stack of diaphragms. Gas with entrained ions from an ion source that is external to the vacuum is blown through an inlet opening into the vacuum system, or through an inlet capillary, into the open ion funnel. The wall of the ion funnel is highly permeable to gas, as it is formed from the faces of the apertured diaphragms with the open spaces between them. The gas escapes through the spaces between the apertured diaphragms, and is removed by a vacuum pump. Only very little gas enters the next chamber of the differential pump system through the small exit opening.

Both phases of an RF voltage (several hundred kilohertz up to several megahertz; a few hundred volts) are applied alternately to the apertured diaphragms. This repels the ions from the inner funnel wall. The method of operation and the effect of this repelling pseudopotential are described in detail in the quoted patent specification, U.S. Pat. No. 5,572,035. The ions are thus prevented from being drawn away through the intermediate spaces between the apertured diaphragms by the escaping gas stream. The ions are separated out. In addition, a graded DC voltage (a few tens of volts in total) is applied to the apertured diaphragms to create a potential gradient along the axis of the stack of diaphragms. This forces the mobile ions through the highly rarefied gas in the ion funnel toward the exit hole.

The system of annular diaphragms, including the ion funnel, has the advantage of actively driving the ions forward to the exit of the annular diaphragm system. They have, however, the disadvantage that, even in the presence of a cooling damping gas, the ions are not collected along the axis of the annular diaphragm system, since the pseudo-force that repels the ions only exerts its effect close to the outer wall of the cylinder or cone created by the diaphragm openings. The ions therefore fill the entire internal space of the cylinder or cone. If this space is densely filled with ions, the Coulomb repulsion ("space charge effect") will even increasingly drive the ions against the pseudopotential wall, whereas the part of the internal space that is close to the axis has a lower ion density.

The repelling effect of the walls around the interior space is, moreover, different for ions with different specific masses. "Specific mass" here refers to the ratio of mass to charge. For heavy ions (ions with high specific masses) the ions are only reflected when close to the wall, whereas lighter ions are reflected at a greater distance from the wall.

The embodiment of the ion funnel that has become familiar is particularly disadvantageous from this point of view. The published embodiment has the disadvantage that only a relatively narrow band of specific masses passes through. If the diaphragm openings at the final exit are very small, the pseudopotential from the walls of the narrow channel overlap, and the rise in the overlapping pseudopotential reflects light ions back into the funnel; they cannot leave the funnel. Additionally, the pseudopotential along the axis of the ion funnel displays ripples with potential wells, which collect ions inside and can only be emptied if the axial potential gradient has a certain minimum value. On the other hand, too much gas will enter into the next differential pump stage if the diaphragm openings at the final exit of the funnel are too large. If large diaphragm openings are followed by an extraction lens with narrow openings to extract the ions from the ion funnel, the heavy ions cannot be extracted if the space charge is high, since they will be driven outward to the walls of the funnel and escape the drawing field of the extraction lens, which can only effectively extract ions out from the axis.

One solution that is already known is an ion funnel that consists of annular diaphragms each of which is divided into four quadrants, wherein the four quadrants of each annular diaphragm alternately carry the two phases of the RF voltage. The next annular diaphragm then carries the phases of the RF voltage crosswise. Manufacture of this quadrant funnel is, however, extraordinarily difficult and expensive.

The individual guiding elements of the mass spectrometer through which the ions are to pass generally have very sharply defined acceptance cross sections for incoming ions, different as well for the distribution of directions as for the energy distribution of the ions available in the ion beam. The beam cross section in particular can generate high or low transmission of ions into the next section. For example, the literature describes a very narrow, elliptical acceptance cross section for a quadrupole filter. The narrow acceptance cross section extends between the two pole pieces that carry the DC voltage that attracts the ions. In contrast, a time-of-flight mass spectrometer with orthogonal injection of the ions into an ion pulser requires a very narrow ion beam, close to the axis, and with the most homogeneous distribution of directions and energies that can be achieved. These requirements cannot be satisfied by the stack of annular diaphragms constructed in the manner known at present, even though the possibility of actively driving the ions in the axial direction is a strong factor in favor of the use of diaphragm stacks.

SUMMARY OF THE INVENTION

The invention provides ion guides that contain diaphragm stacks that, at least partially, do not possess the exclusively circular apertures that have been used so far, but rather oval, longish, rectangular, peanut-shaped, strongly indented holes, or even apertures with highly complicated, almost irregular shape.

"Longish holes" refer here to holes that have a greater longitudinal diameter than transverse diameter. Longish holes may have oval, rectangular, or other lengthy forms. An "indented" hole refers to a hole whose inner edge exhibits indentations toward the center of the hole, with an apex of the indentations directed towards the center.

The stack of diaphragms is thus characterized by hole shapes that do not simply create cylindrical or conical inner spaces with reflective walls for ions by pseudopotentials inside the stack, but which exercise specific effects on the shape of the ion beam inside the diaphragm stack. Diaphragm stacks whose diaphragms have apertures shaped in accordance with the invention are able not only to actively drive the ion beam forward, but are also able to shape its cross section. In combination with a damping and cooling gas in the diaphragm stack, the ions can be cooled and, in diaphragm stacks with suitable aperture shapes, can be collected in particular regions of the internal space. Active forward drive of the ions inside the diaphragm stack has been known for a long time, but the shaping of the ion beam has not. In particular it is possible, with special shapes and arrangements of the apertures, to collect the cooled ions along the axis of the diaphragm stack.

A particularly favorable; and quite surprising, embodiment of such a diaphragm stack displays an aperture shape that has two hyperbolic indentations opposite each other. Diaphragms of identical form are stacked up here, every second diaphragm being turned through 90°. A crossed pair of diaphragms may be used, the two phases of an RF voltage being applied alternately to successive diaphragms. This creates four hyperbolic pseudopotential walls within the diaphragm stack, between which a quadrupole field, as is a familiar from quadrupole systems with four pole rods, is generated. Each of these hyperbolic pseudopotential walls carries one phase of the RF voltage. In contrast to a quadrupole system with four pole rods, however, an active forward drive can be applied to the ions here. Ions that have given up their kinetic energy to a damping gas accumulate precisely along the longitudinal axis of the diaphragm stack. They can be moved toward the outlet by a potential difference along the axis of the diaphragm stack; the driving voltage is freely selectable.

The diaphragms of the diaphragm stack may have a shape that minimizes the electrical capacitance of the diaphragm stack by having only small cross-over areas. In a similar manner, a hexapole ion guide can be built.

The forward drive inside the stack may not be directed in one direction only. It is possible, to force ions to oscillations in longitudinal direction, for instance, to fragment ions by multiple collisions with the damping gas. Even the formation of a potential well in axial direction inside the stack is possible, enabling ions to oscillate in this potential well in axial direction. In another example, the ions may be moved through the stack of diaphragms in pulses, to eject ions in a timely manner. Even the application of traveling wave fields or other traveling potential profiles is possible.

The diaphragms can be fastened by means of narrow protrusions to electrical circuit boards, where they may, for instance, be soldered. It is also possible to mount the electrical circuit components, such as resistors and capacitors, on the circuit boards. An example of the circuitry of a diaphragm stack for an ion funnel may be configured such that, instead of the ion funnel, any other diaphragm stack can also be connected in a similar way. The circuit uses a transformer to generate the RF voltage; two identical secondary windings have a center tap that permits a controllable DC voltage to be fed in for the axial potential gradient.

Appropriate shaping of the apertures in the diaphragms can also be used to give the ion beam other cross-sectional shapes. A series of tapering slit diaphragms can be used to generate beams with an elliptical cross section. Suitable shaping of the diaphragm holes can even be used, to lead an ion funnel to a beam divider, in which the beams emerge from two apertures at the end of the diaphragm stack. If two small quadrupole diaphragm stacks are positioned behind the holes, two very fine ion beams can be created.

BRIEF DESCRIPTION OF THE DRAWINGS

The above and further advantages of the invention may be better understood by referring to the following description in conjunction with the accompanying drawings in which.

DETAILED DESCRIPTION

The invention provides special ion guides, based on stacks of apertured diaphragms, which not only drive the ion beam actively forward, but which are also able to shape its cross section. In connection with a damping and cooling gas, ions can be collected in particular regions of the interior of the diaphragm stack.

The characteristic property of the diaphragm stack in accordance with the invention is that, at least in part, it no longer contains the circular, coaxial holes in the diaphragms that until now have been exclusively used, but has diaphragms with oval, rectangular or even more complicated, even indented apertures. A further feature in accordance with the invention is that successive diaphragms, which are now no longer rotationally symmetrical, can each be arranged at a fixed angle with respect to one another. The features in accordance with the invention permit specific influence to be exerted on the ion beam, in particular influence on the cross-sectional shape of the ion beam and on the homogeneity of the energy in the ion beam. Active forward driving of the ions inside the diaphragm stack has been known for a long time, but the shaping of the ion beam has not. It is, for example, possible to use specially shaped holes in the diaphragms and particular rotations of successive apertured diaphragms, in combination with filling the stack with a cooling gas, in order to collect the cooled ions along the axis of the diaphragm stack, which is never possible with circular holes. Thus, "cross-sectional shape" here refers not only to the external contour of the ion beam, but also to the ion density distribution within the cross section of the beam.

The term "apertured diaphragm" should not be understood in the strict sense in which the diaphragms may only contain apertures that have a completely closed contour. The term "aperture" (or "hole") should rather mean that there is a potential that surrounds the internal space. Those parts of the hole that do not have an effect on the ion beam can therefore even be open toward the outer edge of the diaphragm, provided that all parts of the apertured diaphragms are connected to the same voltage.

Figure 3A:
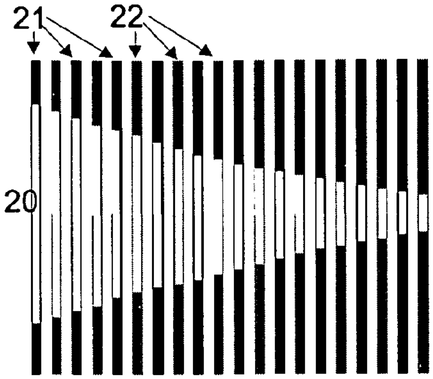
FIGS. 3A and 3B illustrate an ion funnel with a square entrance aperture (20), tapering to a narrow rectangle at the exit, thus generating an ion beam (23) with an elliptical cross section.
Figure 3B:
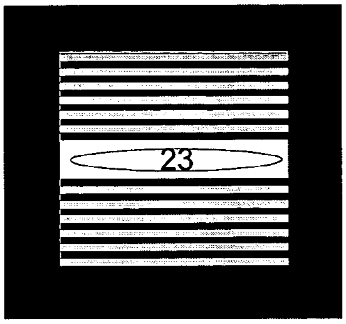
Figure 4:
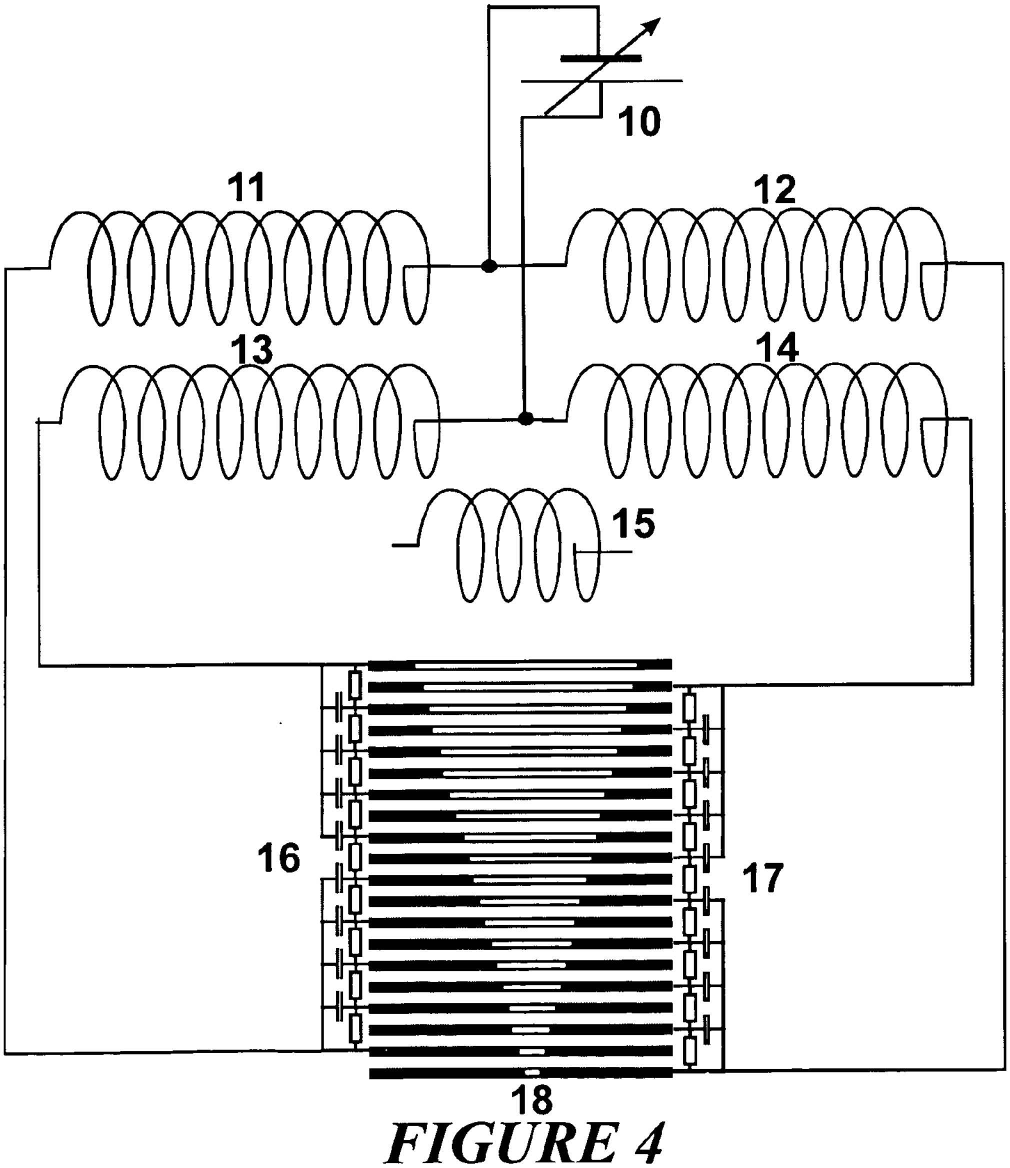
FIG. 4 illustrates schematically the connection of a diaphragm stack (in this case, an ion funnel) through a transformer with two secondary windings (11, 12) and (13, 14); a controllable DC voltage (10) is supplied to their center tap. It is this DC voltage that generates the voltage drop along the axis of the diaphragm stack system. The voltage dividers (16) and (17) supply the apertured diaphragms with graduated DC voltage, while the capacitors at the voltage dividers feed in the RF voltage; the arrangement of the capacitors in the illustrated circuit load each of the two secondary windings equally.

Appropriate shaping of the apertured diaphragms can be used to give the ion beam desirable cross-sectional shapes. For instance, as illustrated in FIGS. 3A and 3B, a series of tapering slit diaphragms (21, 22) can be used to generate beams with an elliptical cross section. Narrow elliptical beam cross sections are described in the literature as the ideal acceptance profile for RF quadrupole filters. It is possible to apply a potential gradient to the interior of this slit diaphragm funnel to drive the ions toward the narrow exit slit. FIG. 4 illustrates a configuration with RF and DC voltages that provides this kind of drive to the ions.

Figure 5:
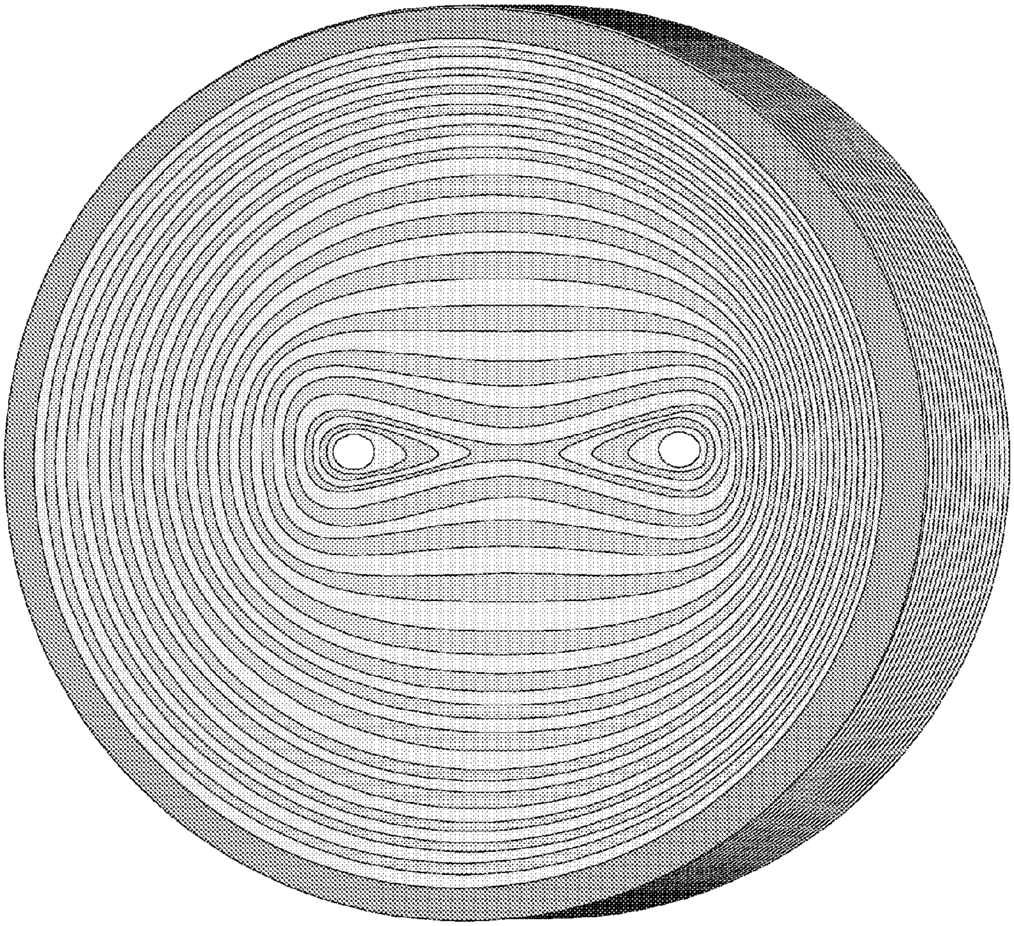
FIG. 5 gives a view inside an ion funnel that tapers to two exit openings, so generating two output ion beans.
Figure 6:
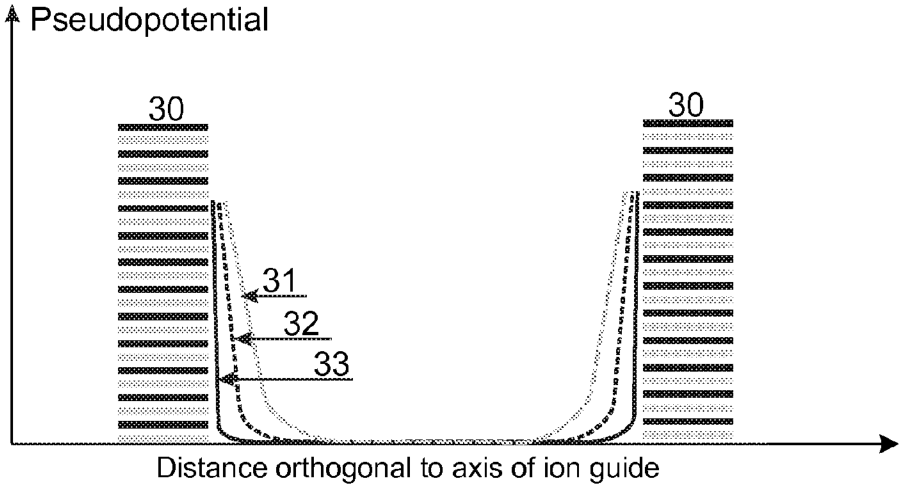
FIG. 6 illustrates the repelling pseudopotential between two diaphragm walls (30) for heavy ions (33), for medium-mass ions (32) and for light ions (31). If the channel between the diaphragm walls becomes very narrow, for instance at the exit of an ion funnel, light ions cannot enter the narrow region because the potential gradients on the two sides begin to overlap.

By suitable shaping of the diaphragm holes it is even possible, as illustrated in FIG. 5, for an ion funnel to divide an ion beam, and for the two partial beams to emerge from two diaphragms at the end of the diaphragm stack. The holes in successive diaphragms are initially circular, then are elliptically extended, and then indented in the shape of a peanut shell until they become double holes. If quadrupole diaphragm stacks are positioned behind the holes, as is explained in detail below, two very fine ion beams can be created. The quadrupole diaphragm holes for two ion beams can be positioned in one diaphragm.

An arrangement with multiple holes in each diaphragm can also combine multiple ion beams. A number of funnels can thus filter the ions out of several gas streams and guide them into a further ion funnel. In this way it is possible to combine the ions from a number of ion sources, such as sources for analyte ions and for reference ions.

The type of circuitry shown in FIG. 4 is an example for the electrical supply of diaphragm stacks that can be generally used for all diaphragm stacks in which forward drive of the ions is required. So instead of an ion funnel, any other type of diaphragm stack can be connected in this way. The circuit employs a transformer with a single primary winding (15) to generate the RF voltage, and two identical secondary windings (11, 12) and (13, 14), whose center taps permit a controllable DC voltage (10) to be supplied to generate the axial potential gradient. The two identical secondary windings can, for example, be made using two RF litz wires insulated from one another. The transformer can consist of an air-core transformer on a ceramic tube, an RF transformer on a straight ferrite core or in a ferrite housing, a transformer with a toroidal core, or any other conventional type of transformer. The two voltage divider chains (16) and (17), with capacitors that supply consistent RF voltage to each individual apertured diaphragm, supply the diaphragms in the diaphragm stack with the DC voltages and RF voltages. In this way the ions can be driven toward the narrow exit (18) of the slit diaphragm stack shown here.

If a transformer with more than two secondary windings is used, a more complicated potential profile can be generated along the axis of the diaphragm stack. It is possible, for instance, to build potential wells to collect the ions before ejecting them from the stack. With direct connection of the diaphragms to voltage-generating transistors, e.g. MOSFETs, without using transformers at all, it is possible to overlay more complicated potential profiles, and even to move these potential profiles along the axis. Traveling wave fields can be generated, or other form of traveling potential profiles.

Figure 1:
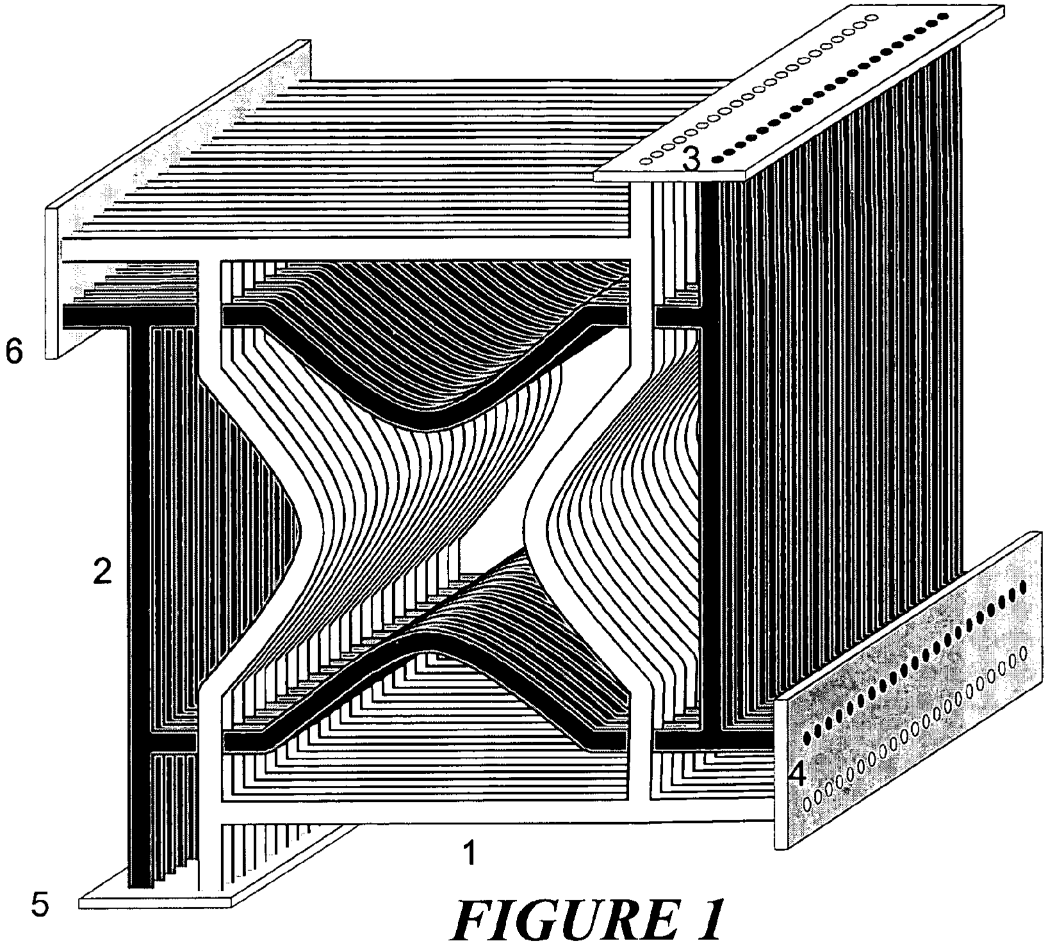
FIG. 1 is a schematic representation of a diaphragm stack that forms an RF quadrupole field with the possibility of driving the ions forward. The diaphragm stack consists of apertured diaphragms of the same shape (1) or (2) (see FIG. 2 for details), each turned through 90° with respect to its neighbor. The apertured diaphragms are soldered to electrical circuit boards (3), (4), (5) and (6) and are supplied with RF and DC voltages by circuitry (not illustrated) on these boards. Opposing hyperbolic surfaces, consisting each of a series of strips of metal sheet, are each supplied with the same phase of the RF voltage. The damping gas with which the space is filled causes the ions, after they have given up their kinetic energy, to accumulate precisely along the axis of the diaphragm stack, where, under the influence of the axial potential gradient, they drift along the axis to the exit. In contrast to a diaphragm stack consisting of diaphragms with circular holes, there is no ripple in the pseudopotential along the axes of the diaphragm stack.
Figure 2:
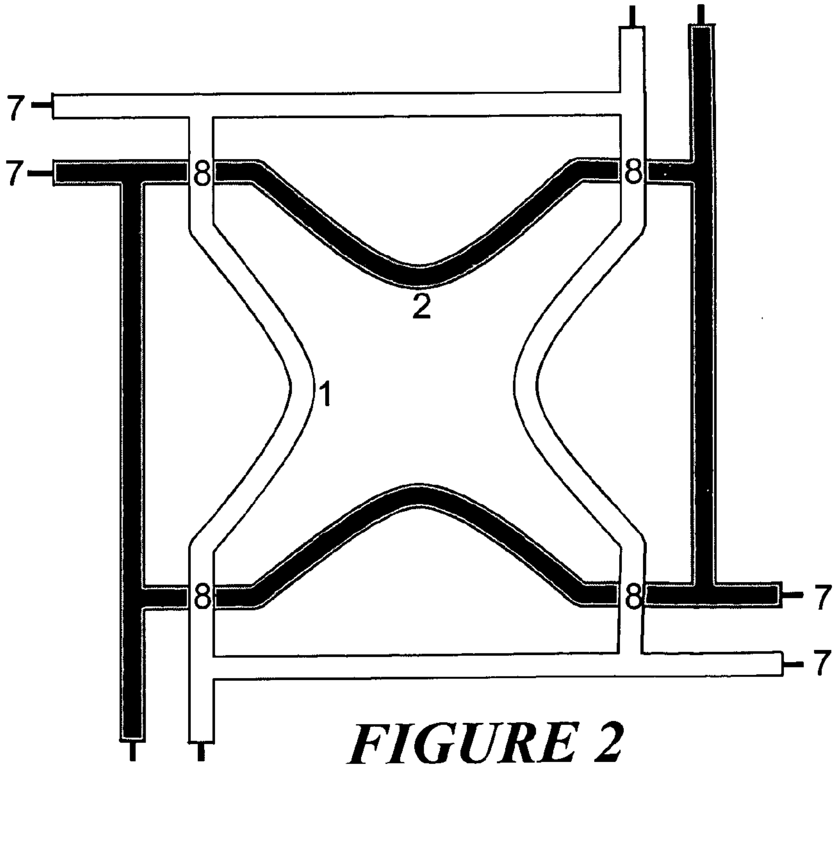
FIG. 2 illustrates apertured diaphragms (1) and (2), used for the diaphragm stack shown in FIG. 1. Both apertured diaphragms (1) and (2) have identical shapes, and are simply assembled into the diaphragm stack at 90° with respect to one another.

A particularly spectacular embodiment of a diaphragm stack in accordance with the invention is illustrated in FIG. 1, using a single type of diaphragm shape with indented aperture, shown in FIG. 2 as a crossed pair of diaphragms. Here four virtual hyperbolic pseudopotential walls are created by the edges of the openings of hyperbolic indentations in the diaphragm stack, between which a quadrupole field, as is a familiar from quadrupole systems with four pole pieces, is generated. Each of these virtual hyperbolic pseudopotential wall surfaces carries one phase of the RF voltage; the wall surfaces that are opposite each other carry the same phase.

This quadrupole diaphragm stack has a special effect when filled with a damping cooling gas: ions that have given up their kinetic energy to the cooling gas, which damps their movement, accumulate precisely along the longitudinal axis of the diaphragm stack, due to the well-formed minimum of the pseudopotential in the axis. A diaphragm stack with circular holes can never have this effect. In contrast to a quadrupole system with pole pieces, which is the only alternative capable of having a similar effect, it is relatively easy here to apply active forward drive to the ions. A potential difference along the axis of the diaphragm stack, generated by a circuit such as that of FIG. 4, and whose driving voltage can be adjusted to any desired value, can move the ions toward the exit even through a heavily damping cooling gas. Movement of the ions through the cooling gas toward the ion exit can even be achieved when the cooling gas is flowing in the opposite direction. Since the pseudopotential along the axis of the quadrupole diaphragm stack does not have any ripple (a further advantage of this arrangement), the potential gradient along the axis can be made as small as desired, until it is just sufficient to move the ions in the desired direction.

There is a further remarkable advantage of this quadrupolar diaphragm stack. Each quadrupole rod system has a well-known lower limit for the specific masses of the ions which can be guided in such a system. Less well known is the fact that there is also a higher mass limit for the specific ion masses, however not as sharp as the lower mass limit. This limit exists because the repelling force of the quadrupolar pseudopotential field becomes weaker and weaker for ions of higher masses. The upper limit is reached at when the thermal energy of the ions is sufficient to overcome the repelling force near the pole pieces. As a rule of thumb, this upper mass limit amounts to about the 40-fold value of the lower mass limit. For the quadrupolar diaphragm stack, the upper limit is much higher, at about the 60-fold or even 80-fold value of the lower mass limit, owing to the fact that there is no smooth surface of a rod, but a stack of sharp edges increasing the pseudopotential near the edges.

The mass range of ions which can be guided in such a system, is larger than in an conventional quadrupole rod ion guide. This is highly essential in quadrupolar collision cells which now can be operated by lower RF voltages thus exhibiting a lower value for the lower mass limit. The collision cell according to the invention thus can hold much lighter fragment ions than cells with conventional quadrupole rods.

The close spacing of the diaphragms usually gives diaphragm stacks a very high electrical capacitance, making it necessary to use very powerful RF generators. This is not true of the quadrupole diaphragm stack in accordance with FIG. 1. The diaphragms (1) and (2) of the diaphragm stack are shaped in such a way as to minimize the capacitance of the diaphragm stack because, as can be seen from FIG. 2, only very small areas of diaphragms with different RF phases facing each other at the crossover locations (8). The crossover surfaces can be made even smaller if the straps of the diaphragms are made yet narrower in the crossover region.

The diaphragm stack in accordance with FIG. 1, which creates a quadrupole RF field inside it, is referred to below, for the sake of simplicity, as a “quadrupole diaphragm stack”.

The apertured diaphragms of the quadrupole diaphragm stack can, as with other shapes of diaphragm stack, be fastened by means of narrow protrusions (7) on the apertured diaphragms, into electrical circuit boards (3), (4), (5) and (6), where they may, for instance, be soldered. It is also possible for the electrical circuit components, such as resistors and capacitors, to be mounted on the circuit boards (3), (4), (5) and (6). These circuit boards serve both to hold the apertured diaphragms in place and to provide their electrical supply. The narrow protrusions (7) can, however, also simply be pushed into suitable connector strips (as used for flat band cables), which are mounted here on circuit boards. The circuit boards themselves can consist of ordinary plastic circuit boards, but may also, if there are particular demands on the purity of the vacuum, consist of ceramic or glass-ceramic material.

Figure 7:
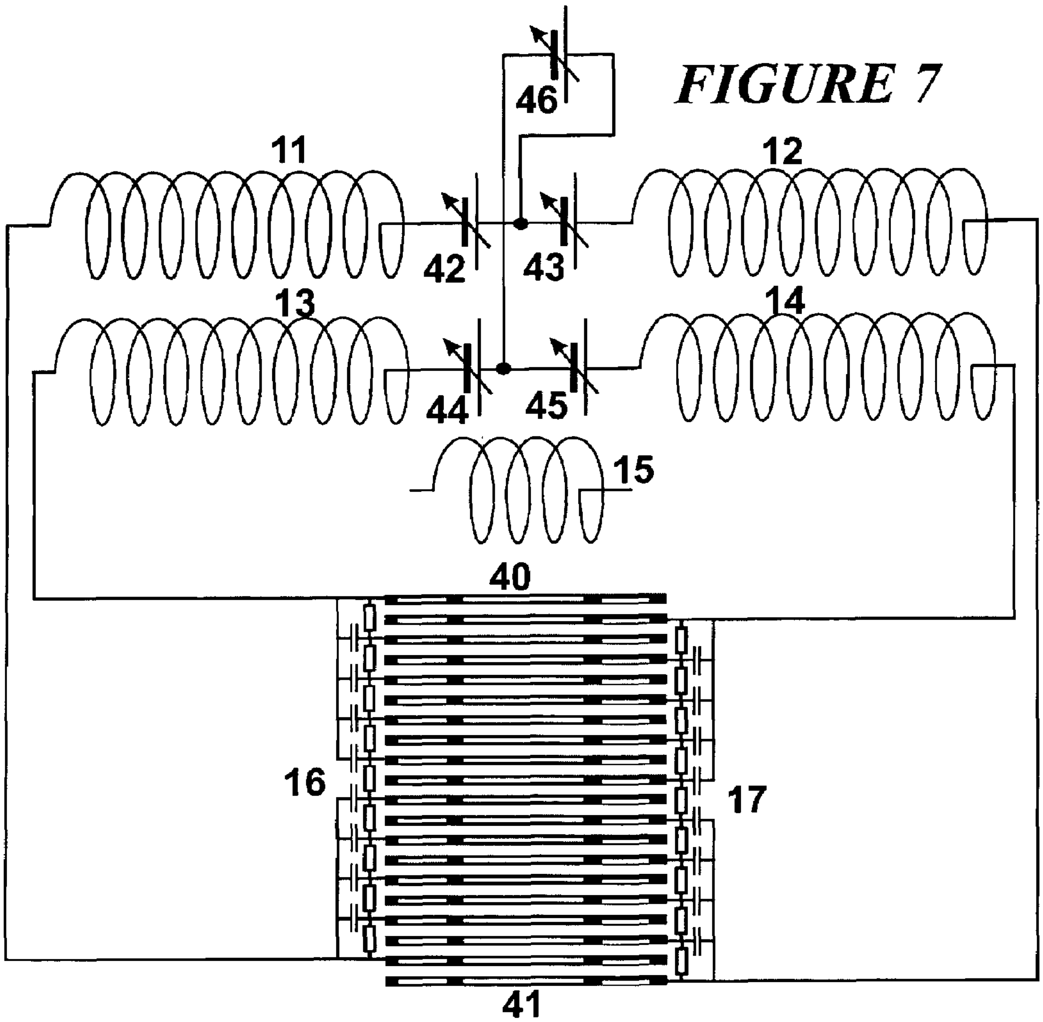
FIG. 7 illustrates the circuitry of a quadrupole diaphragm stack as shown in FIG. 1, where, in addition to an axial potential gradient, two DC voltages of different polarity are superimposed on the two phases of the RF voltage. If the voltages from the voltage generators (42), (43), (44) and (45) are identical, the effect is that of a quadrupole filter, only allowing ions with a restricted range of specific masses to pass through. If the voltages (44) and (45) are zero, a ramp is obtained, where at the inlet (41) of the diaphragm stack only the pure RF voltage is present, while the superimposition of two DC voltages of different polarity onto the two phases of the RF voltage rises toward the exit (42). This increasingly restricts the range of specific masses of ions that pass through. This circuitry makes the diaphragm stack into an ideal pre-filter (or posifilter) for a mass-selective precision quadrupole filter.

The circuitry for the quadrupole diaphragm stack can be implemented exactly as is shown in FIG. 4 for an ion funnel. This circuit has a transformer to provide the RF voltage, where the center taps of the two identical secondary windings (11, 12) and (13, 14) permit the connection of a controllable DC voltage (10) for the axial potential. The quadrupole diaphragm stack can also be used as a mass filter, by superimposing two DC voltages of opposing polarities onto the two phases of the RF voltage, as is illustrated in FIG. 7. If the DC voltages (42), (43), (44) and (45) are all equal, a mass filter is obtained in which the range of specific masses for the ions that are admitted can be adjusted by changing the level of this DC voltage (42, 43, 44, 45). An axial potential gradient is maintained by means of the adjustable voltage (46).

If the RF voltages applied to the apertured diaphragms are not very high, for instance having peaks of less than 1,000 volts to ground, it is possible to use RF generators with direct outputs (without transformers); the DC voltages are then superimposed in a manner analogous to the circuits shown in FIGS. 4 and 7.

A method of connecting the quadrupole diaphragm stack that uses the diaphragm stack to create a prefilter with ramp effect upstream of a precision mass filter is particularly interesting. This is done by making the DC voltages (44) and (45), shown in FIG. 7, zero. The two voltage generators, (44) and (45), can then be entirely omitted. In this case, the diaphragm stack carries a pure RF voltage, without any superimposed DC voltage, at its inlet (40), whereas at the exit (41) the two DC voltages (42) and (43) of opposed polarities are fully superimposed. On the way from the inlet (40) to the exit (41), all the ions whose specific masses are significantly too small or too large are increasingly filtered out. The ions are slowly driven forward here by a very small voltage (46).

By using a cooling gas, the ions that pass through the prefilter split into two fine ion beams which approach each slowly one of the two opposing pseudopotential walls superimposed by the attracting DC potentials. The two fine ion beams are held in two small potential wells between the attracting DC potential gradient and the repelling pseudopotential gradient near the virtual walls; the ions slightly oscillate here under the force of the RF field. It is expedient if the subsequent quadrupole precision mass filter is operated with the same diameter, the same frequency and the same phase of the RF voltage. This then means that ions with very low energies of only a fraction of an electron-volt can be injected into the precision mass filter; this usually cannot be achieved. Thanks to the prefilter, both the stray field of the RF voltage and the stray field of the DC voltages at the inlet to the precision mass filter are compensated or at least minimized, thus permitting low-energy injection of the ions. This prefilter thus has the advantage of allowing the use of a very short precision mass filter; it is even possible to operate the precision mass filter with some cooling gas, something that is not possible without such a prefilter.

A diaphragm stack with an opposing potential ramp can be positioned at the exit of the precision mass filter. The selected ions, still having the shape of two fine ion beams, can reliably and stably returned to the axis of the diaphragm stack by this postfilter.

A quadrupole diaphragm stack can, in particular, be used very effectively as a collision cell for the fragmentation of selected ions. This makes it possible to use even a very high collision gas pressure of between 0.01 and 1 Pascal, preferably in the range of 0.1 Pascal, in the collision cells. The injected ions then fragment within a very short distance of only a few centimeters; the ion fragments, however, remain in the collision gas because they lose immediately all their kinetic energy through the large number of impacts. They can only be made to drift to the output of the collision cell by the axial potential gradient; they move precisely along the axis of the diaphragm stack, from where they can be withdrawn by suitable extraction lenses and made to form fine, highly parallel ion beams with a homogeneous energy distribution. As already mentioned above, a quadrupole diaphragm stack is particularly advantageous because of its higher mass range. It can be operated by a lower RF voltage, allowing to hold even very small fragments which are normally lost in a quadrupole rod system.

If the pressure of the collision has to be much lower, for what reasons ever, the fragmentation can be assisted by an oscillation of the selected ions inside the stack. For this, the axial potential difference has to be switched in a fast manner to both polarities, sending the ions to and fro. The oscillation can be supported by a potential well created along the axis of the diaphragm stack.

Another application of the quadrupole diaphragm stack concerns the time control of the ion beam. The beam can be modulated by means of a modulated axial potential difference. Ions can be ejected in such a manner that the ions near the end of the stack are ejected with rather low energies, and ions from areas near the entrance get higher ejection energies to be able to catch up with the ions from the end. By using a traveling wave field, the ion beam can be formed to packages, in which ions of different specific masses have the same or at least similar velocities. With traveling potential pulses, still other effects can be induced. In all these cases, the collection of ions near the axis of the stack produces very fine beams of ions which never is possible with stacked rings.

A further application of the gas-filled quadrupole diaphragm stack is the separation of ions injected in pulses by means of their shape-dependent ion mobility in the collision gas. For instance, ions of the same mass, but with different molecular shapes, can be separated temporally by a continuously applied axial electrical field due to their different drift velocities in a collision gas. The ions of different molecular shape can then, for example, be measured in temporal sequence in a time-of-flight mass spectrometer with orthogonal ion injection.

The apertured diaphragms of the diaphragm stack can preferably be manufactured from metal sheet. The apertured diaphragms can consist, for instance, of stainless-steel, nickel or of nickel-plated aluminum. Plastic diaphragms that have been metalized, or made electrically conductive in some other way, may also be used. The method of manufacture of the apertured diaphragms depends on the selected material. Metal apertured diaphragms can, for instance, be created by laser cutting, by water jet cutting, by contour-etching or by simple punching. Apertured diaphragms of aluminum or stainless-steel are particularly suited to a contour-etching process that creates very smooth, stress-free apertured diaphragms and permits very finely detailed shapes of high precision; the aluminum diaphragms can then be nickel-plated to prevent the development of insulating oxide layers. Apertured diaphragms of stainless-steel can also be punched; once the punching tools have been made, they can then be manufactured at extremely low costs.

Depending on the internal size of the holes, the apertured diaphragms are between 0.3 and 1.5 millimeters thick, and are assembled with intermediate spaces also in the range of 0.3 to 1.5 millimeters. If, for instance, the quadrupole diaphragm stack in accordance with FIG. 1 is manufactured with an apex diameter of eight millimeters between the hyperbolic apexes, apertured diaphragm thicknesses of 0.4 to 0.8 millimeters are favorable, with an approximately similar dimension for the intermediate spaces. It is not, however, essential that the size of the intermediate spaces is equal to the thickness of the apertured diaphragms.

The apertured diaphragms are preferably assembled over an appropriately shaped core; once the apertured diaphragms have been fixed in place, the core is simply withdrawn. The quadrupole diaphragm stack in accordance with FIG. 1 can be assembled on a quadrupole core that keeps the apertured diaphragms accurately coaxial and secures them effectively against undesired rotation. Suitably shaped spacer sheets are inserted between the apertured diaphragms. They must cover at least two overlapping locations (8), and are shaped in such a way that they can easily be withdrawn after the apertured diaphragms have been fixed in place and the assembly core has been removed.

At the end of the diaphragm stack, an extraction lens can also be integrated into the structure of the diaphragm stack in order to transfer the ions into the next stage of the mass spectrometer. The extraction lens preferably consists of three apertured diaphragms, where the extraction potential for the ions is applied to the central apertured diaphragm. The first apertured diaphragm of the extraction lens is set to a potential that slightly repels the ions within the diaphragm stack. The extraction potential of the second apertured diaphragm in the extraction lens reaches through the opening of the first apertured diaphragm in the extraction lens, and extracts the ions that are located there. The accelerated ions are catapulted through the opening in the third apertured diaphragm of the extraction lens, at which stage they can again be decelerated by the DC voltage on the third apertured diaphragm of the extraction lens. If it is necessary to maintain pressure differences between the different stages, one of the three apertured diaphragms of the extraction lens can form the chamber wall for the next stage. The apertured diaphragms in the extraction lens are not usually supplied with RF voltages; only DC voltages are applied to them.

The apertured diaphragms of the extraction lens can also be attached to the electrical circuit boards, and these can be used to supply them with their DC voltages.

It is also possible to combine diaphragm stacks of the different embodiments described above. Thus it is possible to combine the stack of an ion funnel constructed in the way that is already known, but with a relatively large exit opening, with a quadrupole diaphragm stack. This may take the form of a single diaphragm stack with continuous circuit boards, or two separate diaphragm stacks, one behind the other. In this way the disadvantage of ion funnels that do not collect the ions along their axis is compensated by the quadrupole segment of the diaphragm stack. Collecting the ions along the axis is particularly advantageous when extraction lenses are used.

A diaphragm stack can also consist of diaphragms whose openings form a continuous transition between the coaxial holes of an ion funnel and the shapes of a quadrupole diaphragm stack. Speaking very generally, the shapes of holes required for one specific effect can have a continuous transition to the shapes of holes that will have a different effect on the injected ion beam.

Of particular interest are ion guides consisting of a number of diaphragm stacks, possibly incorporating other types of ion guides, assembled in a complex manner in order to perform complex functions.

A complex system of this type can filter the ions out of a stream of gas, then pass the ions in a focused beam through a number of differential pump stages, select one species of ions for subsequent fragmentation, then fragment the ions that have been selected in this way and form the fragments into a fine, axial beam. The beam of fragmented ions formed in this way can then be processed by a mass analyzer. Quadrupole mass filters, radio frequency quadrupole ion traps, time-of-flight mass spectrometers with orthogonal ion injection or ion cyclotron resonance mass spectrometers can be used for the mass analysis. All these types of mass spectrometer can accept the fine, axial ion beams formed in this way to advantage.

The complex system suggested above can, for instance, be assembled as follows: the first differential pump stage initially contains a combination of a conventional ion funnel with a wide exit opening of around six millimeters hole diameter and a quadrupole diaphragm stack with an eight millimeter apex diameter and an extraction lens that transfers the well-focused ion beam to the next stage of the pump. The ion funnel is about six centimeters long, while the quadrupole diaphragm stack has a length of four centimeters.

The subsequent pump stage contains just one quadrupole diaphragm stack, four centimeters long.

In the third pump stage, which contains cooling or collision gas at a pressure of between 0.01 and 1 Pascal, preferably about 0.1 Pascal, there follows in sequence a four centimeter quadrupole prefilter, a four centimeter precision mass filter, a four centimeter postfilter and a twelve centimeter collision cell, also implemented as a quadrupole diaphragm stack.

Like the precision mass filter, all the quadrupole diaphragm stacks have an apex diameter of eight millimeters. The precision mass filter can be a structure manufactured by spark erosion (U.S. patent application Ser. No. 11/187,692) or a glass quadrupole (U.S. Pat. No. 4,213,557). The four diaphragm stacks, each four centimeters in length, for the first pump stage, the second pump stage, the prefilter and the postfilter may all have identical structures, only differing in their electrical connections. There is an adjustable potential difference of between 30 and 80 volts between the postfilter and the collision cell, and this supplies the kinetic energy required to inject the ions powerfully into the collision cell. If the diaphragms are all 0.5 millimeters thick, and if they are all assembled with an intermediate space of 0.5 millimeters, a total of 280 identical diaphragms are required for the quadrupole diaphragm stack.

The entire structure is only 38 centimeters long. This is exceptionally short for such a complex function. It should be noted that the precision mass filter is also operated with a high cooling gas pressure, for which reason it is kept very short, so that only small ion losses resulting from unfavorable collision cascades have to be tolerated. This short length, however, is only made possible by the prefilters and postfilters.

Figure 8:
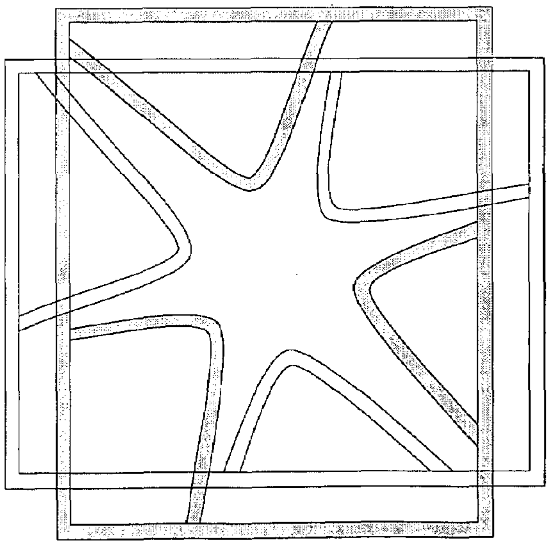
FIG. 8 presents a form of apertured diaphragms for a hexapole ion guide, analogue to the diaphragms for the quadrupole ion guide in FIG. 2. Both diaphragms have identical shapes; to build the hexapole stack successive diaphragms are rotated by 90° and overturned.

With knowledge of the basic ideas according to this invention, the specialist is able to combine or modify the embodiments so described in many different ways. It is possible, for instance, to create a hexapole stack system with forward drive using apertured diaphragms according to FIG. 8, each having three indentations. Apertured diaphragm systems can be constructed that use several phases of an RF voltage. It is possible to construct switchable storage cells for ions, particularly if the electrical drive is supplied using transformers with more than two secondary windings. All such embodiments are included here in principle.

What is claimed is:

1. An ion guide consisting of one or more apertured diaphragm stacks comprising apertured diaphragms arranged with small intermediate spaces and insulated from each other, alternately supplied with two phases of an RF voltage, wherein in at least one of the diaphragm stacks, each diaphragm has an aperture with two parallel sides and two sides formed of opposing hyperbolic indentations extending into the aperture and each diaphragm is rotated 90° with respect to adjacent diaphragms so that an RF quadrupole field is created within the at least one diaphragm stack.

2. An ion guide in accordance with claim 1, wherein a potential profile is generated along the axis of one or more diaphragm stacks by means of electrical connections to the apertured diaphragms.

3. An ion guide in accordance with claim 2, wherein the potential profile along the axis changes with time.

4. An ion guide in accordance with claim 1, wherein the apertured diaphragms have narrow external protrusions; wherein mounts for the apertured diaphragms are implemented in the form of electrical circuit boards into which the narrow protrusions of the apertured diaphragms are inserted; and wherein the electrical circuit boards also contain the electrical components for supplying the RF voltage and, when used, DC voltages.

5. An ion guide in accordance with claim 1, wherein DC voltages of opposing polarity are superimposed on the two phases of the RF voltage in at least one of the diaphragm stacks, with the effect that the quadrupole field only admits ions having a restricted range of specific masses.

6. An ion guide in accordance with claim 1, wherein DC voltages of opposing polarity are superimposed on the two phases of the RF voltage in at least one of the diaphragm stacks, and where the proportion of DC voltage changes from one apertured diaphragm to the next.

7. An ion guide in accordance with claim 6, wherein the two DC voltages of opposing polarity rise continuously from zero to a maximum value, thus creating a prefilter or postfilter for a precision mass filter.

8. An ion guide in accordance with claim 1, wherein a first diaphragm stack is implemented as an ion funnel, while a further diaphragm stack is arranged so that a quadrupole field is generated in its interior.

9. An ion guide in accordance with claim 1, wherein a precision mass filter is also incorporated.

10. An ion guide in accordance with claim 9, wherein the precision mass filter is preceded by a prefilter formed by DC voltages of opposing polarity which rise continuously from zero to a maximum value and are superimposed on the two phases of the RF voltage in at least one of the diaphragm stacks.

11. An ion guide in accordance with claim 9, wherein the precision mass filter is operated at a pressure of between 0.01 and 1 Pascal.

12. An ion guide in accordance with claim 9, wherein a collision cell is incorporated, constructed as a diaphragm stack within which a quadrupole field is generated.

13. An ion guide consisting of an apertured diaphragm stack comprising a plurality of apertured diaphragms insulated from each other and alternately supplied with the phases of an RF voltage, wherein each of the plurality of diaphragms has an aperture with three indentations of hexapolar shape extending into the aperture and each diaphragm is rotated 90° with respect to adjacent diaphragms, so that an RF hexapole field is created within the apertured diaphragm stack.

14. An ion guide consisting of an apertured diaphragm stack having an axis and comprised of a plurality of apertured diaphragms insulated from each other and alternately supplied with the phases of an RF voltage, wherein in the direction of the axis, the apertures in the diaphragms differ beginning with a wide opening, changing to an elongated opening, then to an opening having the shape of a peanut shell with indentations and then to two physically separate openings, so that a beam of ions entering the diaphragm stack along the axis is divided into two partial ion beams at the two separate openings.

* * * * *

UNITED STATES PATENT AND TRADEMARK OFFICE

CERTIFICATE OF CORRECTION

PATENT NO. : 7,391,021 B2
APPLICATION NO. : 11/243440
DATED : June 24, 2008
INVENTOR(S) : Carsten Stoermer et al.

It is certified that error appears in the above-identified patent and that said Letters Patent is hereby corrected as shown below:

Title page, item (73): Assignee:

Replace “Bruker Dalton K GmbH” with --Bruker Daltonik GmbH--.

Signed and Sealed this

Twenty-third Day of December, 2008

JON W. DUDAS
*Director of the United States Patent and Trademark Office*